Patented Nov. 12, 1935

2,020,714

UNITED STATES PATENT OFFICE 2,020,714

LUBRICATING HYDROCARBON PRODUCT

Carl Wulff and Wilhelm Breuers, Ludwigshafen-on-the-Rhine, Germany, assignors to I. G. Farbenindustrie Aktiengesellschaft, Frankfort-on-the-Main, Germany No Drawing. Application October 4, 1933, Serial No. 692,128. In Germany October 11, 1932

11 Claims. (Cl. 87—9)

The present invention relates to improved hydrocarbon products, and more particularly to improved lubricating oils and to a process for the manufacture of such products.

We have found that valuable improvements of hydrocarbon products, especially of lubricating oils, are obtained by incorporating with such products highly polymerized vinyl compounds containing oxygen. For example the polymerization products of fatty acid vinyl esters, as for example the polymerized vinyl ester of oleic acid or of palmitic acid, and the polymerized vinyl ethers of butyl alcohol or of actodecyl alcohol are suitable. The polymerization products of vinyl carboxylic acids, i. e. of acrylic acid or of acrylic acid derivatives, as for example polymerized acrylic acid octodecyl ester, are also eminently suitable as additional substances. The said additional substances may be obtained by the polymerization of the monomeric compounds or by a suitable chemical conversion of other polymerized vinyl compounds, as for example by the esterification of polymerized vinyl alcohol with stearic acid or by the reaction of polymerized vinyl alcohol with aldehydes. The polymerization products of vinyl compounds which are used according to the present invention, have a molecular weight of at least about 1000 and preferably between about 3000 and 10000.

The addition of a few per cent, as for example from 0.5 to 10 per cent, of the said products usually suffices to increase the viscosity of a lubricating oil considerably. At the same time the setting point of the oil is lowered and the temperature-viscosity curve flattened.

The said additional substances have a good stability at high temperatures; they do not give rise to resinification or carbonization and burn without residue, for example in combustion engines; for example the additional substances are not depolymerized when they are heated in a lubricating oil to 300° C. for a duration of 3 minutes (test).

Instead of adding ready-made polymerization products of vinyl compounds containing oxygen, there may be added to the hydrocarbon products the monomeric compounds, the latter then being converted into the polymerization products, preferably in the present of suitable polymerization accelerators, as for example boron fluoride or its double compounds with ethers, boron trichloride, aluminium chloride or peroxides, such as benzoyl peroxide, the viscosity of the hydrocarbon products such as lubricating oils is increased in this way. Instead of pure polymerization products, mixtures thereof may be employed or polymerization products from mixtures of the said vinyl compounds with each other or with other polymerizable substances.

The polymerized compounds may also be subjected to a further chemical reaction, as for example a hydrogenation which may be effected in the presence of nickel and at temperatures between 180° and 200° C.; for example polymerized vinyl phenyl ether may be hydrogenated to form polymerized vinyl cyclohexyl ether.

Hydrocarbon products other than lubricating oils, as for example benzine, gas oil, lubricating greases and initial materials for the preparation of candles, may also be improved by the said additions. Thus, in the case of liquid hydrocarbon products and of greases the viscosity is increased. Benzine is rendered more suitable for being pumped. In the case of lubricating greases the losses encountered by use become smaller and the temperature viscosity curve is improved. Candles become more transparent since the paraffin wax or other waxy material employed for their preparation becomes softer and less liable to acquiring fissures.

The following examples will further illustrate the nature of this invention but the invention is not restricted to these examples. The parts are by weight.

Example 1

From 1 to 3 per cent of a solid polymerization product of stearic acid vinyl ester having a molecular weight between about 3000 and about 5000 are added to a spindle oil. The effect of the addition on the viscosity and the temperature viscosity curve of the spindle oil may be seen from the following table:—

|  | Absolute viscosity at | | |
|---|---|---|---|
|  | 20° C. | 40° C. | 80° C. |
| Spindle oil without addition | 0.348 | 0.136 | 0.046 |
| Spindle oil 1 percent addition | 0.396 | 0.156 | 0.054 |
| Spindle oil 2 percent addition | 0.437 | 0.169 | 0.059 |
| Spindle oil 3 percent addition | 0.512 | 0.198 | 0.064 |

Example 2

If 1 per cent of polymerized vinyl octodecyl ether or 1 per cent of polymerized vinyl butyl ether having a molecular weight of about 3000 be added to a machine oil, an oil is obtained having the following viscosity characteristics:

|  | Viscosity in ° Engler at | | Viscosity index |
| --- | --- | --- | --- |
|  | 38° C. | 99° C. |  |
|  | Degrees | Degrees |  |
| Machine oil without addition | 7.9 | 1.5 | 4.9 |
| With 1 percent of polymerized vinyl octodecyl ether | 8.7 | 1.56 | 26. |
| The same after having been heated at 300° C. for 3 minutes | 8.6 | 1.57 | 34.6 |
| With 1 percent of polymerized vinyl butyl ether | 11. | 1.71 | 62.2 |
| The same after having been heated at 300° C. for 3 minutes | 10.8 | 1.66 | 46.2 |

Example 3

By polymerizing a mixture of 3 parts of vinyl octodecyl ether and 1 part of vinyl butyl ether by means of the double compound of boron fluoride and ether, a highly viscous product is obtained which in the following is referred to as "No. 1."

Similarly a product called "No. 2" is obtained by starting from a mixture of 1 part of vinyl octodecyl ether and 1 part of vinyl butyl ether.

The following table shows the influence of these products on the pour point of a lubricating oil obtained from a German mineral oil:

Pour point in ° C.
Oil without addition _____ + 4
Oil+1% No. 1 _____ −18
Oil+0.5% No. 1 _____ −23
Oil+0.1% No. 1 _____ −18
Oil+1% No. 2 _____ −24
Oil+0.5% No. 2 _____ −24
Oil+0.1% No. 2 _____ −10

The influence of the said products on the viscosity and the viscosity index is shown in the following table:

|  | Viscosity in ° Engler at | | Viscosity index |
| --- | --- | --- | --- |
|  | 38° C. | 99° C. |  |
|  | Degrees | Degrees |  |
| Oil without addition | 9.0 | 1.57 | 22.8 |
| Oil + 1% No. 1 | 9.43 | 1.61 | 47.4 |
| Oil + 1% No. 2 | 11.7 | 1.69 | 43.5 |

Similar improvements of lubricating oils are obtained by means of polymerization products from mixtures of vinyl butyl ether and vinyl ethyl ether.

The influence of the additions on the hydrocarbon products largely depends on the viscosity of the added polymerization products which can be influenced to a large extent by an appropriate choice of the conditions used for the polymerization, as for example the temperature, the nature of the solvent and the catalyst used.

What we claim is:—

1. A lubricating hydrocarbon product having a viscosity at least as high as that of a lubricating oil and having incorporated therewith a small amount of a polymerization product from a vinyl compound containing oxygen, said polymerization product having a molecular weight of at least about 1000.

2. A lubricating hydrocarbon product having a viscosity at least as high as that of a lubricating oil and having incorporated therewith between 0.5 and 10 per cent of a polymerization product from a vinyl compound containing oxygen, said polymerization product having a molecular weight of at least about 1000.

3. A lubricating hydrocarbon product having a viscosity at least as high as that of a lubricating oil and having incorporated therewith between 0.5 and 10 per cent of a polymerization product from a vinyl compound containing oxygen, said polymerization product having a molecular weight between 3000 and 10000.

4. A lubricating oil having incorporated therewith a small amount of a polymerization product from a vinyl compound containing oxygen, said polymerization product having a molecular weight of at least about 1000.

5. A lubricating oil having incorporated therewith between 0.5 and 10 per cent of a polymerization product from a vinyl compound containing oxygen, said polymerization product having a molecular weight of at least about 1000.

6. A lubricating oil having incorporated therewith between 0.5 and 10 per cent of a polymerization product from a vinyl compound containing oxygen, said polymerization product having a molecular weight between 3000 and 10000.

7. A lubricating hydrocarbon product having a viscosity at least as high as that of a lubricating oil and having incorporated therewith a small amount of a polymerized acrylic acid ester, said polymerized ester having a molecular weight of at least 1000.

8. A lubricating hydrocarbon product having a viscosity at least as high as that of a lubricating oil and having incorporated therewith between 0.5 and 10% of a polymerized acrylic acid ester, said polymerized ester having a molecular weight between 3000 and 10000.

9. A lubricating hydrocarbon product having a viscosity at least as high as that of a lubricating oil and having incorporated therewith a small amount of polymerized acrylic acid octodecyl ester, said polymerized ester having a molecular weight of at least about 1000.

10. A lubricating hydrocarbon product having a viscsoity at least as high as that of a lubricating oil and having incorporated therewith a small amount of polymerized stearic acid vinyl ester, said polymerized ester having a molecular weight of at least about 1000.

11. A lubricating hydrocarbon product having a voscosity at least as high as that of a lubricating oil and having incorporated therewith a small amount of a polymerized vinyl octodecyl ether, said polymerized ether having a molecular weight of at least about 1000.

CARL WULFF.
WILHELM BREUERS.